Dec. 29, 1964   G. SIEGMUND ETAL   3,163,048
ACCELEROMETER
Filed April 11, 1960
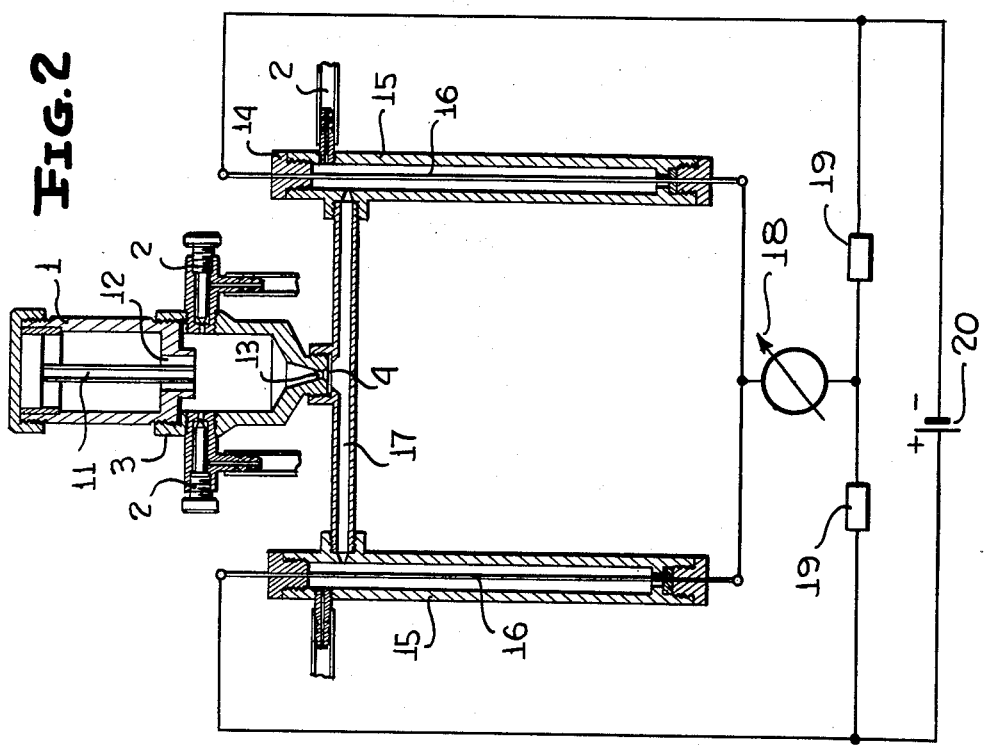
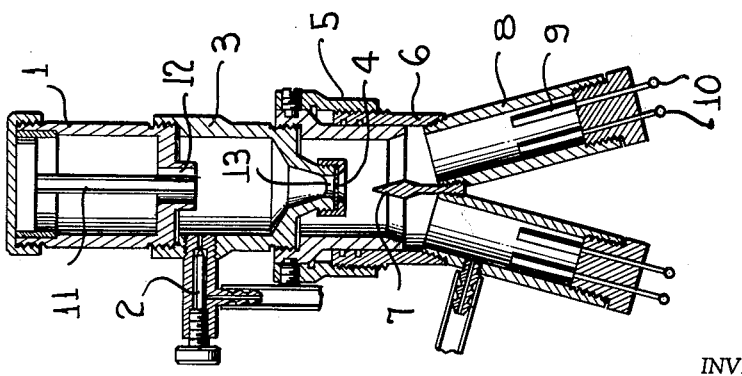
INVENTORS
JOSEF SCHABERGER
& GERHARD SIEGMUND
BY *Hurvitz & Rose*
ATTORNEYS

3,163,048
ACCELEROMETER

Gerhard Siegmund, Bingen-Kempton, and Josef Schaberger, Bingen (Rhine), Germany, assignors to Jos. Schaberger & Co. G.m.b.H., Gau-Algesheim (Rhine), Germany
Filed Apr. 11, 1960, Ser. No. 21,558
3 Claims. (Cl. 73—516)

The invention relates to a system for measuring and also for compensating automatically for cross-wind or transverse forces, in the case of fast flying bodies.

Flying bodies driven missile-fashion which cannot be kept on their intended flight path by means of constant flight guidance, are moved sideways from their flight path because of cross winds, as well as pull and thrust exerted obliquely to the flight path, if no devices are provided which compensate for the sideways motion.

The magnitude of the sideways shift depends on the cross acceleration and on the time during which the cross acceleration is effective. In order to compensate for this shift, a corresponding counteracting acceleration or force must be employed.

Various devices for the production or control of such counteracting forces, compensating for the sideways shift, have been known. Thus, for example, objects swinging with constant frequency have been suspended movably around a pivotal point in the flight axis, in such manner that they make contacts at their lateral reversal points, a condenser being charged on each side in circuit with said contacts. Whenever no transverse forces are effective, the objects swing out uniformly in both directions, and correspondingly the closing times of the contacts as well as the size of the charges, which are absorbed by the condensers, are equal. In the case of sideways operating forces the contact-times change. The contact located in the acceleration direction is closed longer, in proportion to the acceleration, and the other contact for a correspondingly shorter time. Therefore, the condensers are charged to different strengths. The differences are measured in a Wheatstone bridge and are changed into control commands, which remain effective until a balance has been achieved through counter-acceleration.

Devices for the balancing of transverse forces have also become known, where the transverse forces are measured through piezoelectric effects by the adding of a time-constant. For this purpose an object which is located centrally between pressure cells, is pressed either against piezoelectric-quartz or against carbon pressure cells. If no transverse forces occur, then the electrical values in both directions are of equal size, and balance each other out.

All these systems, known at present, have as an essential disadvantage, in that they require a relatively complicated operating system. Moreover, in the case of piezoelectric integration, it is necessary to operate via amplifiers.

The disadvantages of these processes are avoided according to the present invention. According to one embodiment of the invention, a jet of an electrically conductive fluid, emerging from a nozzle under constant initial pressure, is guided against the edge of an acute-angled dividing wall, in whose central plane is located the jet axis, so that the jet of fluid is split into two equal parts if no transverse force operates either against the jet or against the dividing wall. The equal parts of fluid are then deflected into two or more electrolytic chambers and strike against the surfaces of electrodes, which in turn are connected with measuring instruments, reacting to different electric stresses, or with control devices.

Preferably the jet of fluid should emerge from the nozzle in the direction of the main acceleration (in rest condition in the direction of the earth). By choosing an electrically conductive liquid with high conductivity, the following will be achieved: the homogeneous jet, when transverse forces are absent, will strike the edge of the dividing wall in such a manner that said jet is split into two jets of equal size. The width of the jet is such that it will still strike against the dividing wall, at the highest transverse acceleration which might be expected, but the jet is carried in full into the electrolytic chambers at the same time.

Whenever the jet, with transverse forces missing, is split into two jets of equal size and is guided into two electrolytic chambers of equal size, containing pairs of electrodes whose surface areas are also equal, then the level of the fluid of the two chambers will rise to the same height so that equally large surfaces of the electrodes are conductively connected. If the two electrolytic chambers are connected with one another via a Wheatstone bridge circuit, then the bridge will be balanced in the case just described.

The equipment constructed in conformity with the invention is installed in a flying body in such a way that the axis of the jet will coincide approximately with the axis of the flying body. Then during flight, any transverse acceleration or transverse force will deflect the jet correspondingly to the opposite side. Consequently more fluid will flow into one of the two electrolytic chambers than into the other. Therefore, the level of the fluid will rise more quickly in one chamber than in the other. Correspondingly, the surfaces of the pairs of electrode plates covered by conductive liquid are also different and the Wheatstone bridge will provide a corresponding current, which, for example, is fed through a potentiomter tap as a control voltage to the operating equipment of the control element, for instance to the rudder assembly of the flying body.

With the beginning of the return of the flying body to the original direction, the direction of acceleration will change, and thus that electrolytic chamber which so far had less electric stress will now be supplied with more electrolytic fluid, corresponding to the return acceleration. As soon as the second pair of electrodes is covered by fluid to the same level as the first, the Wheatstone bridge immediately will be balanced. The flying body has then assumed its old flight direction again.

In the drawings, FIGURE 1 is a view in longitudinal section of a first embodiment of the invention; and FIGURE 2 is a view in longitudinal section of a second embodiment of the invention.

The drawing shows in FIGURE 1 as a first embodiment of the invention, a longitudinal cross section through the essential parts of a device for performing the process according to the invention. The switch gear and the equipment for tapping of the measured values by means of the potentiometer, or through a process of compensation, have not been shown, since they have been designed in the usual manner, known for such purposes.

The device, shown, by way of example, has a tank 1 for the electrolytic fluid, large enough to hold a sufficient quantity of fluid. This tank empties into a level-chamber 3, equipped with a pressure-regulator pipe 2, a nozzle 13 being inserted into the wall, opposite said level-chamber.

The nozzle 13, and thus also the supply tank 1 and the level-chamber 2, are protected against discharge in transit, or previous to their use, by a protective membrane 4.

On a protecting wall of the level-chamber 3, the wall of a chamber 6 is mounted slideably and adjustably by means of a screw bolt 5. In the chamber 6 and opposite to nozzle 13, the dividing wall 7 has been arranged in such a manner as to form an acute angle in the direction of the nozzle.

On both sides of the dividing wall 7 there are duplicate electrolytic chambers 8, each with electrodes 9 and terminal contacts 10.

Through proper setting of the screw bolts 5, the distance between the nozzle 13 and the edge of the dividing wall 7 is fixed, corresponding to specific requirements. The greater the transverse forces that are to be expected, the smaller said distance must be. On the other hand the measurement will be the more exact, the greater the distance.

The chamber 3 comprises equipment for the regulation of the level of the fluid, so that the jet of fluid from the nozzle 13 always emerges under the same pressure.

Regulation of the level of the fluid is achieved by providing an egress channel from the level-chamber 3, in the form of a capillary tube 11 leading to the supply tank 1.

Solutions of silver acetate in weakened tertiary alcohol are examples of suitably electrolytic fluids with a high conductivity. In that case it is advisable to use silver as the material for the electrode plates.

It is possible to make measurements with the same equipment in both the vertical axis of the planes, as well as in the transverse axis, by providing two more electrolytic chambers in the vertical axis.

Another particularly suitable design of the equipment was developed to carry out this process. According to the invention, a line from the supply tank, which is kept under steady pressure, ends either directly or indirectly in two openings, which are arranged in such a manner, preferably symmetrically to the direction of flight, that equal quantities of fluid will flow out of the openings during the same time period.

For this purpose the line, may, for example, empty into a tube which is rigidly fixed to the flying body and may be at right angles to the axis of flight, there being two outlet openings in said tube, which are located in the main axis, which is vertical in relation to the direction of flight and, at horizontal flight, runs parallel to the surface of the earth.

Whenever only longitudinal accelerations and no transverse forces are operating, then an equal quantity of fluid will emerge from each of the two outlet openings of the transverse tube during the same time interval.

This quantity of fluid, for example mercury, enters two narrow tubes opposite the outlet openings, or joining said outlet openings.

If no transverse forces are operative, or if the transverse forces balance each other, then the level of the fluid in the two tubes will be the same. Otherwise, it will be at different heights. The differences in the levels of the fluid in the tubes are established with the help of electrical apparatus, and they are utilized either for measurement of the transverse forces or for the control of the compensating equipment.

In FIGURE 2, the supply tank 1 for the electrically conductive fluid, or for the mercury, consists of two parts, whose lower part is equipped with a venting arrangement 2.

The two parts of the tank are connected with one another through a feed line 12. From the lower part of the tank, which is always kept under a steady pressure, the fluid flows via the tube 13, always arranged in the direction of flight, into the transverse tube 17, which has nozzles at both ends. From these nozzles the mercury or other electrically conductive fluid flows into the proper capillary tube 15, in the inside of which a resistance wire 16 has been installed in the longitudinal direction. On top, the capillary tubes 15 have been closed by protective caps 14.

Through rising of the mercury in one of the two capillary tubes 15, the resistance of the wire in that particular tube is lowered. As soon as transverse forces, i.e., lateral accelerations occur, the quantity of mercury will increase in one of the tubes 15. These changes in resistance of the wires 16 are then made use of via a Wheatstone bridge.

The bridge is formed from variable resistances, the wires 16 and fixed resistance 19. An instrument 18 indicates the changes in resistances. Instead of this instrument, a relay may be provided which controls compensating equipment. Power is supplied from a power source 20.

The compensation of the transverse forces may be accomplished by lowering or extending any elements of the rudder of the flying object. When the rudder-forces become effective, a compensating transverse acceleration occurs. As a result the levels of the fluid in the capillary tubes 15 again approach an equal position.

As soon as the level of the fluid is the same in both tubes, the bridge is balanced and the operation of the rudders ceases.

Just as in the equipment described previously, the supply tank 1 with the level-chamber 3, is protected against unintentional draining by means of a protective membrane 4, in front of the nozzle 13. Here too, venting of the level-chamber 3 from the capillary tubes 15 takes place via an arrangement 2 and a second venting arrangement for the supply tank 1 via the small tube 11.

While I have described and illustrated several embodiments of my invention, it will be clear that variations of the details of construction which are specifically illustrated and described may be resorted to without departing from the true spirit and scope of the invention as defined in the appended claims.

What is claimed is:

1. A system for measuring transverse accelerative forces, comprising a source of a stream of electrically conductive liquid, means dividing said stream of conductive fluid into plural sub-streams conveying relative quantities of said fluid per unit of time which are representative of said accelerative forces, and means comprising an electrical bridge circuit responsive to the impedance of said liquid for comparing said relative quantities, wherein said means for dividing includes plural channels extending in directions extending transversely of said stream.

2. In a guidance system for a flying object having a normal direction of flight, means for generating at least two moving streams of electrically conductive fluid continuously flowing under pressure, means for so positioning said two streams of conductive fluid relative to said normal direction of flight so that said streams flow differentially as a function of accelerations caused by deviations of the direction of flight of said flying object from said normal direction of flight, means for establishing the flow of said streams in opposite directions transversely of said normal direction of flight, and means responsive to the impedance of said fluid for measuring the differential flow of said streams.

3. The combination according to claim 2 wherein said means for establishing includes a pair of fluid conducting means, and a port for supplying a single continuously flowing stream of said fluid to said fluid conducting means, said fluid conducting means being located at right angles to the direction of flow of said single stream.

References Cited in the file of this patent

UNITED STATES PATENTS

| 1,317,072 | Carlier | Sept. 23, 1919 |
| 1,319,036 | Barus et al. | Oct. 21, 1919 |
| 2,319,932 | Jacobs | May 25, 1943 |
| 2,662,956 | Bareford | Dec. 15, 1953 |
| 2,938,390 | McFee | May 31, 1960 |

FOREIGN PATENTS

| 116,375 | Great Britain | June 13, 1918 |
| 331,878 | Germany | Jan. 19, 1921 |